(12) United States Patent
Feliciano (10) Patent No.: US 8,641,198 B2
(45) Date of Patent: Feb. 4, 2014

(54) 3-D IMAGE NIGHT LIGHT GUN

(76) Inventor: Marcos T. Feliciano, Bronx, NY (US)

( * ) Notice: Subject to any disclaimer, the term of this patent is extended or adjusted under 35 U.S.C. 154(b) by 251 days.

(21) Appl. No.: 13/134,372

(22) Filed: Jun. 7, 2011

(65) Prior Publication Data

US 2012/0314190 A1 Dec. 13, 2012

(51) Int. Cl.
*G03B 21/26* (2006.01)
*G03B 29/00* (2006.01)
*G03B 19/18* (2006.01)

(52) U.S. Cl.
USPC ........ 353/43; 353/30; 353/7; 353/9; 362/111; 352/95

(58) Field of Classification Search
USPC ......... 353/30, 43, 7, 9; 362/644, 111; 361/35, 361/806; 352/95
See application file for complete search history.

(56) References Cited

U.S. PATENT DOCUMENTS

| | | | | | |
|---|---|---|---|---|---|
| 2,135,952 | A | * | 11/1938 | Stephens | 353/43 |
| 3,357,769 | A | * | 12/1967 | Thompson | 353/43 |
| 4,756,614 | A | * | 7/1988 | Kato et al. | 353/35 |
| 7,871,192 | B2 | * | 1/2011 | Chien | 362/641 |
| 2010/0277696 | A1 | * | 11/2010 | Huebner | 352/81 |

* cited by examiner

*Primary Examiner* — Tony Ko
*Assistant Examiner* — Magda Cruz
(74) *Attorney, Agent, or Firm* — Feldman Law Group, P.C.

(57) ABSTRACT

Herein featured is a Night Light which can be held by a user that displays three dimensional projected images. The Night Light also equipped with an additional 3-D lens attachment allows the user added viewing fun of the projected images. The all light calm mode feature allows the user to illuminate the Night Light in the event that a user needs illumination quickly or as a stand alone Night Light.

5 Claims, 9 Drawing Sheets

3-D IMAGE NIGHT LIGHT GUN

FIELD OF THE INVENTION

This Invention is directed to a 3-D Image Night Light Gun. More particularly, the Night Light can be readily held by a child and is simple and easy to use. Even more particularly, the Night Light is provided with two image assemblages, a background and a foreground image and light source capable of projecting illuminated images through three magnifying lens producing a three dimensional (3-D) geometric configuration. The Night Light is also provided with means to cycle the projected images.

BACKGROUND OF THE INVENTION

Many articles and devices have been designed and manufactured for use by children. In general, these articles and devices are intended not only to amuse a child, but also to provide a means of comfort. Nevertheless, none disclose or suggest a 3-D Image Night Light Gun capable of projecting 3-D illuminated images which includes an additional stand alone Night Light feature.

SUMMARY OF THE INVENTION

Many children are afraid of the dark and often have difficulty falling asleep and need to be comforted and reassured as they wait to fall asleep. The 3-D Image Night Light Gun not only provides children with a form of calm amusement, but it also comforts them and imparts a form of reassurance and security until sleep over takes them. In addition, the Night Light is simple, easy and safe to use.

In general, the 3-D image Night Light Gun comprises: A gun casing or housing having a cyclical image array combined of two image assemblages, the background image assemblage and the 3D foreground image assemblage, and a LED light nested within the image array, including a micro motor and a sprocket to cycle cyclical image assemblage, an image projection tunnel within gun casing or housing having 2 magnifying lens and 1 focus lens in conjunction displaying both background still images and foreground 3D images to appear as though on two viewing planes, adding to the 3D viewing effect; including an all light calm activated mode.

In one embodiment, the power source is an electrical battery pack.

In another embodiment, the cyclical 3D image array consist of a double cyclical transparent lens assemblage, hollow image receptacles to accept background and foreground 3D images, and a triple lens projection tunnel extending the image nested within said cyclical 3D image array.

In a further embodiment the LED member, cyclical image array and the image projection tunnel help produce the 3D visual effect.

In still a further embodiment the activation and deactivation means is in the form of a trigger touch sensitive button, contacting power button closing electrical current The 3D Image Night Light Gun also includes a micro motor to cycle the cyclical image array and an all light calm mode button to initiate the secondary LED's.

These and further embodiments of the 3D Image Night Light Gun are set forth in more detail herein below.

BRIEF DESCRIPTION OF THE DRAWINGS

The 3-D Image Night Light Gun is further demonstrated by the following drawings wherein.

DETAILED DESCRIPTION OF THE DRAWINGS AND THE INVENTION

The 3-D Image Night Light Gun will be better understood from the ensuing description when taken together with the accompanying drawing wherein like reference numerals denote like parts.

Figure 1:
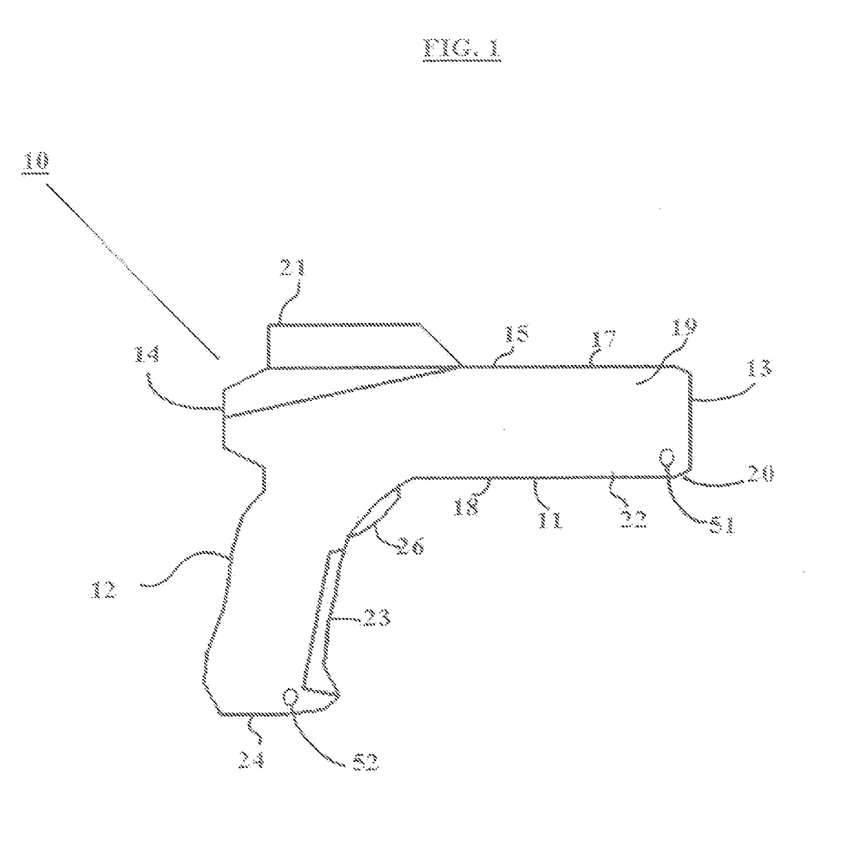
FIG. 1 is a side view of the 3-D Image Night Light Gun.

The 3-D Image Night Light Gun generally identified by reference numeral 10 in FIG. 1, is in the form of a gun casing or housing 11. The gun casing or housing 11 of the 3-D Image Night Light Gun 10 is provided with a rubber style handle 12 for an easy erogeric form grip. Preferably, the casing or housing 11 of the Night Light 10 is provided in the configuration shown in FIG. 1 which is in the form of a gun having an open hollow front section 13 and a snap-fit rear section 14 to access cyclical image array compartment. The open front hollow end section 13 and snap-fit rear end section 14 are connected by a hollowed mid section 15. The gun casing or housing 11 formed by the open front hollow end section 13 and snap-fit rear end section 14 and mid-section 15 has a top 17, a bottom 18 and opposed sides 19 and 20. As used throughout the application and in the appended claims, the term "erogeric gun configuration" is intended to mean and should be understood as meaning the description thereof set forth herein above and as illustrated in the drawings.

Seated on the top rear 17 of the gun casing or housing 11 is a 3D prism lens attachment 21 that serves to view the projected images with the added prism lens effect. Other conventional and commercially available 3D lens can also be used; however, they are not as effective as the prism style lens. The opposed side 19 and 20 of the casing or housing 11 can be provided with a commercially available glow-in-the-dark soft plastic material 22 to absorb any shock should the 3-D Image Night Light Gun drop or fall onto a hard surface.

The accessible snap-fit cover 23 allows access to the power source compartment within the rubber handle 12 of the gun casing or housing 11 and function similar to slide or snap-fit covers used to access battery compartments of commercially available portable telephones, cameras and toys. Accessible snap-fit cover 23 can be provided on either the bottom 24 of the handle 12 of the gun casing or housing 11 (here shown on the bottom front of handle 12 of the casing or housing 11), and the trigger touch sensitive power button 26. LED lights 51 and 52, activated upon all light calm mode of the Night Light are positioned on the front end 13 of gun casing or housing 11 and on the bottom of handle 12.

Figure 2:
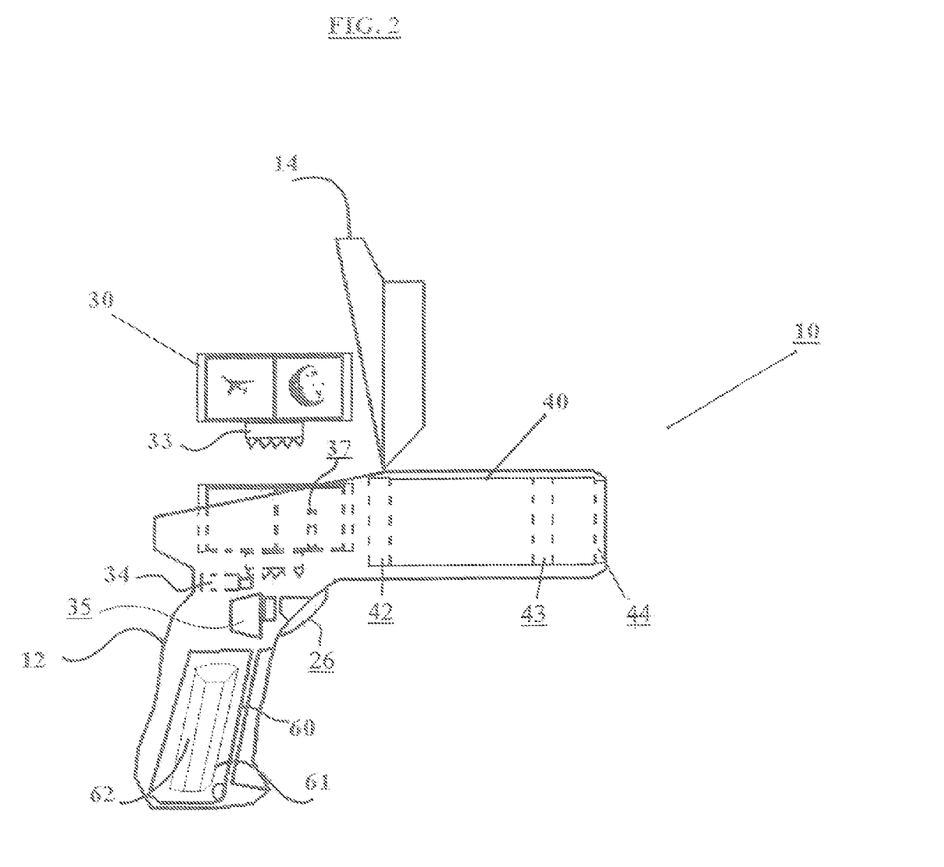
FIG. 2 is a side view depicting the components of the Night Light gun.

FIG. 2 illustrates the snap-fit rear compartment 14 for the cyclical image array 30 of the 3-D Image Night Light Gun 10, seated within the cyclical image array is a primary LED 37 to illuminate the images, an image projection tunnel generally indicated by reference numeral 40, including two magnifying lens 42 and 44 and focus lens 43. Immediately beneath the cyclical image array is a micro motor 34, which contacts cyclical image array sprocket member 33, initiating rotation of the cyclical image array 30. A power source to provide power generally indicated by reference numeral 60, the power package 61 is used to provide an electrical current and house commercially available selection of dry cell batteries such as AAA batteries 62.

Figure 3:
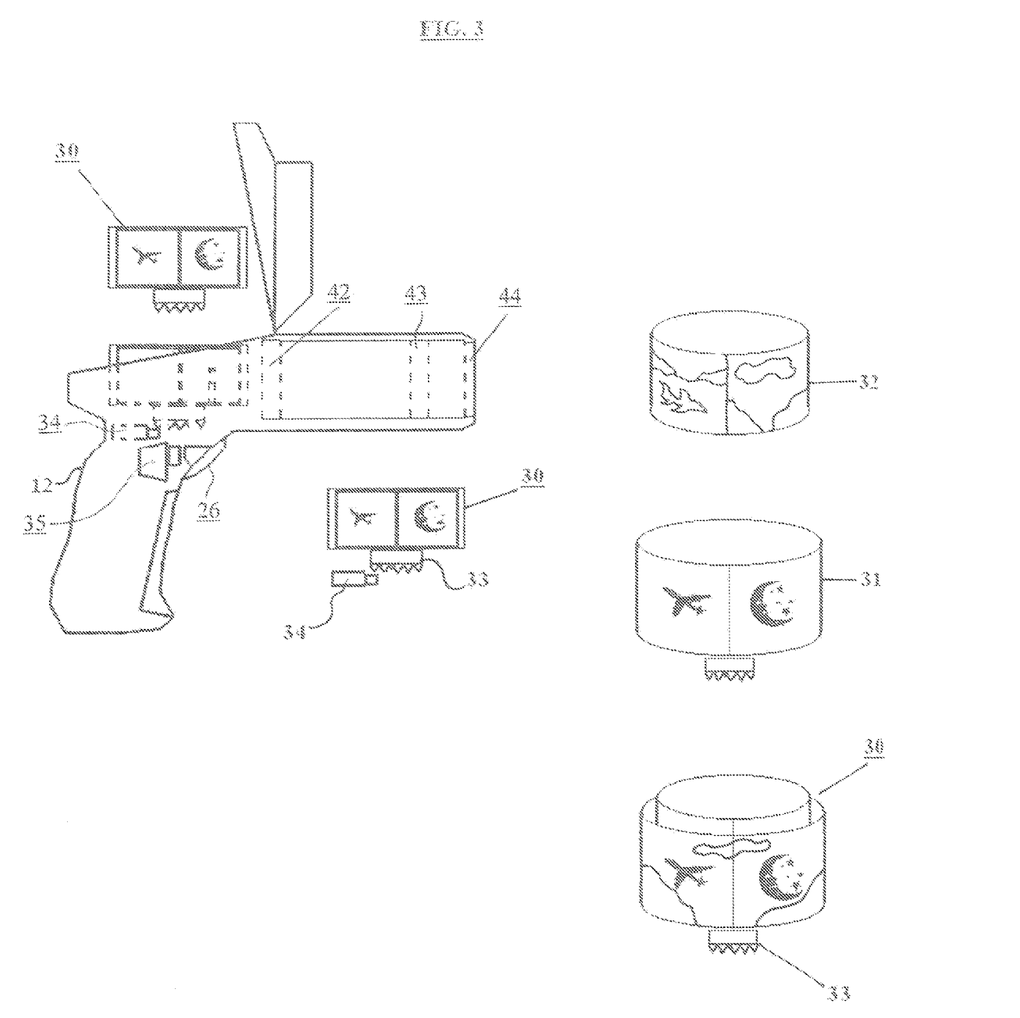
FIG. 3 is a side view of the cyclical image array with the snap-fit rear compartment opened, revealing the cyclical image array within the Night Light which illustrates the background image as well as the foreground 3D image, and combined the images produce a 3D effect; and the micro motor.

FIG. 3 illustrates details of the cyclical image array 30 of the Night Light. The cyclical image array includes two image assemblages, the background image assemblage 32 placed within the 3D imago assemblage 31, shown here in the geometric form of a cylinder. The cyclical image array 30 has an attached sprocket 33 contacting micro motor 34 and trigger mechanism 26 and main power button 35 within the housing of the night light gun, including two magnifying lens 42 and 44 and one focus lens 43. The cyclical image array 30 is removable and secured to the top portion of the handle 12 of the Night Light by conventional means such as a snap-fit engagement within the Night Light.

Figure 4:
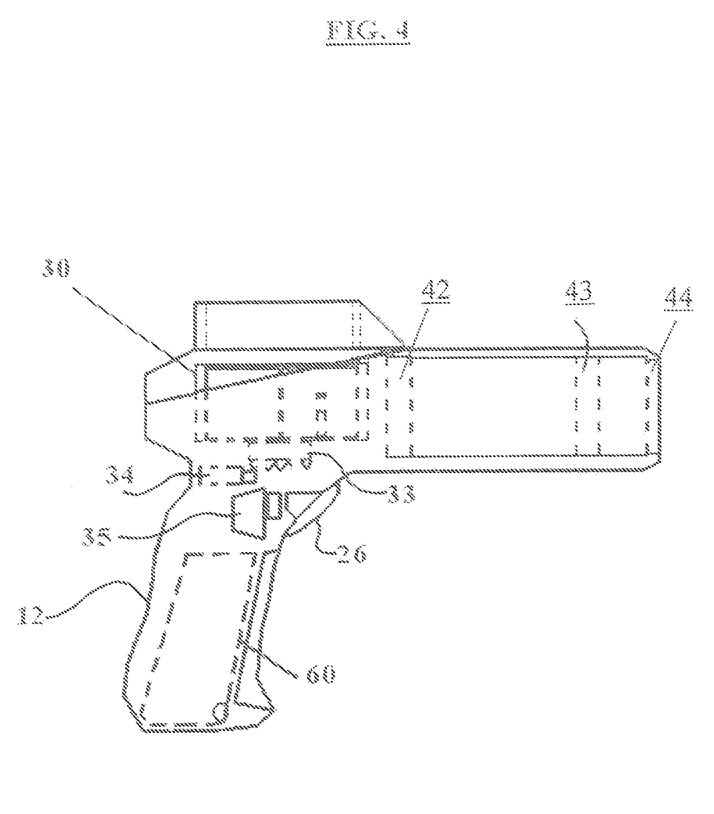
FIG. 4 is a side view illustrating the trigger touch sensitive power button.

In the embodiment illustrated in FIG. 4, the means of movement used to provide rotation to the cyclical image array 30 comprises a contact sprocket member 33, and a micro motor 34. The trigger touch sensitive button 26 contacts the main power button 35 which closes the electrical circuit and allows the power to flow from the power source 60 to the micro motor 34. Secured to the center hub of the handle 12 the micro motor causes the sprocket 33 to cycle which, in turn, causes the cyclical image assemblages to rotate, including two magnifying lens 42 and 44 and one focus lens 43.

Figure 5:
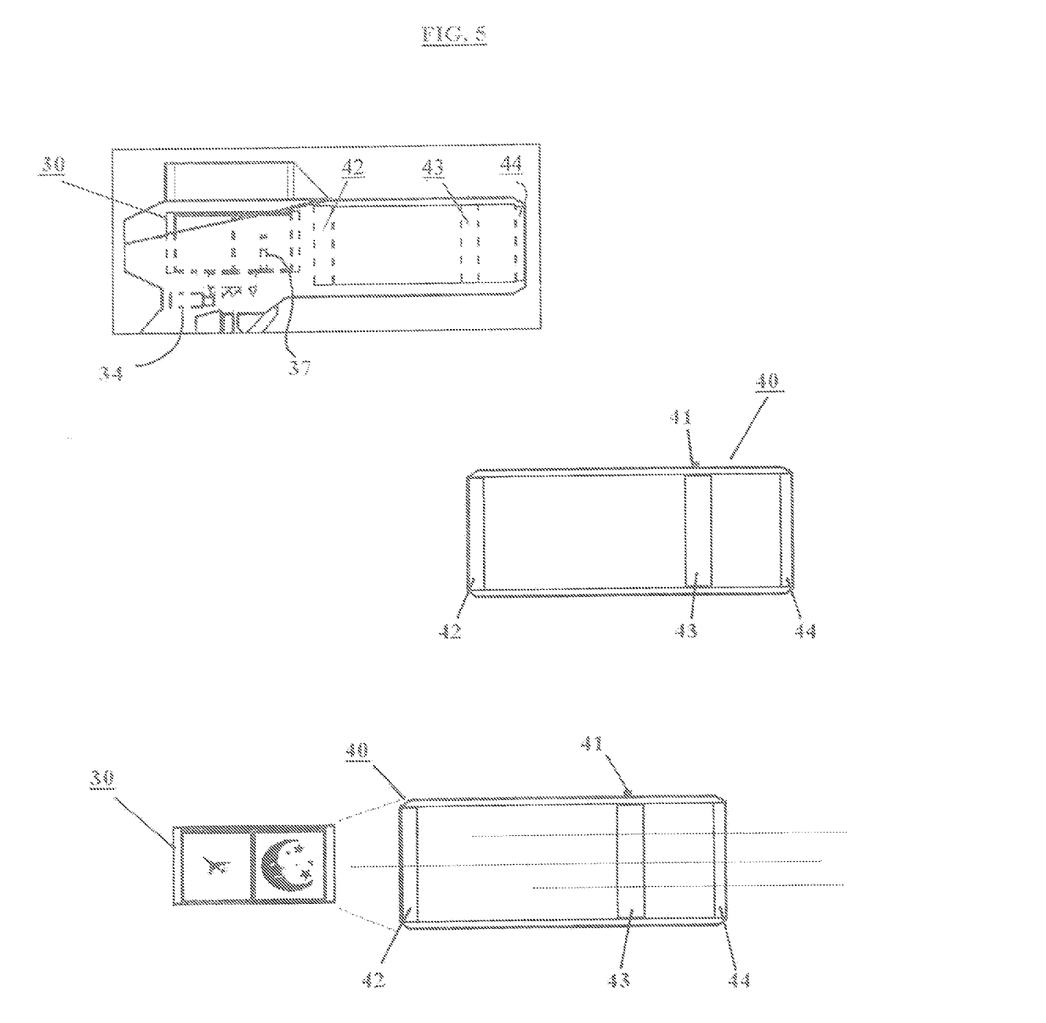
FIG. 5 is a side view of the triple magnification lens projection tunnel of the Night Light.

FIG. 5 illustrates the 3D image projection tunnel 40 in the term of a rectangle consisting of two magnifying lenses 42, and 44 and one focus magnifying lens 43. The cyclical image array 30 produces images that travel through magnifying lens 42, 43, and 44 which are then projected to the wall. Focus magnifying lens 43 has attached to the top a spring focus button 41 that is easily accessible and controls the position of the focus magnifying lens 43.

The primary source of illumination for the Night Light is provided by an LED light 37. The LED light 37, is positioned within the hollow center of the cyclical image array as indicated in FIG. 5. LED light 37 is a commercially available LED of the type that has a narrow light band enabling the two currently stationed images of the cyclical image array 30 to be displayed in a 3-Dimensional configuration.

The micro motor 34 is one that is commercially available and of the type typically employed in remote control devices to steer and manipulate remote controlled toy cars, airplanes and helicopters.

Figure 6:
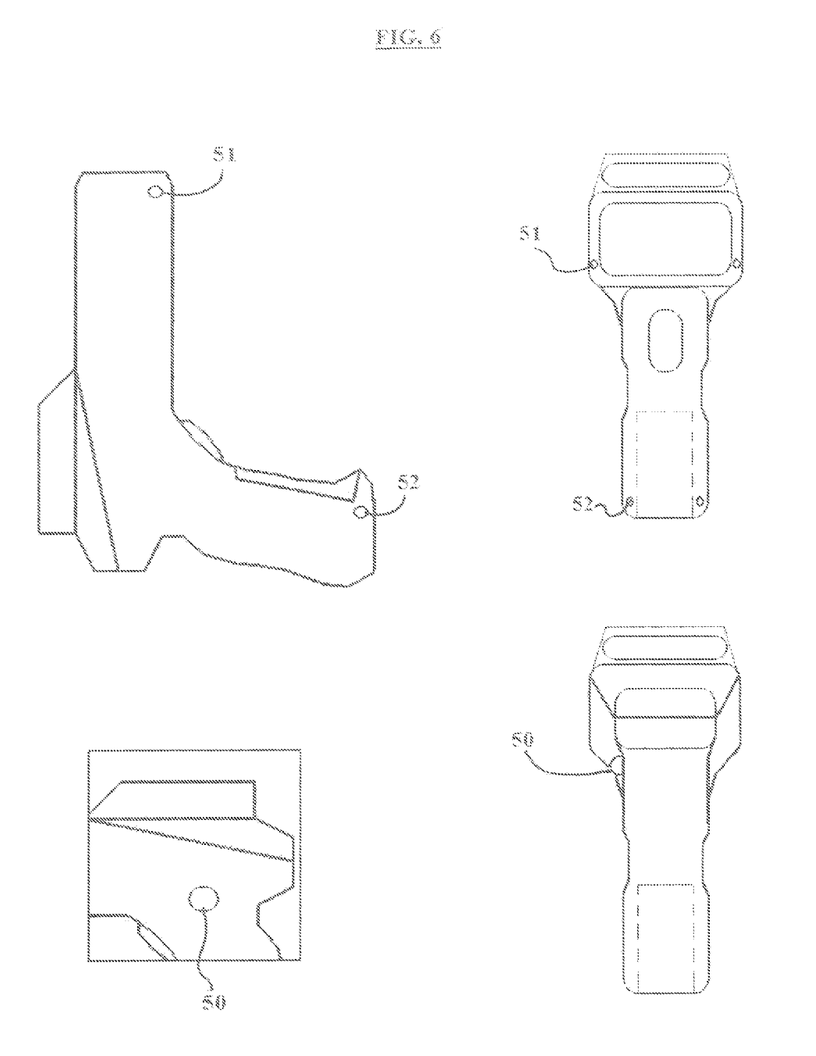
FIG. 6 depicts the side, front, and back views, including the button to initiate all light calm mode of the Night Light.

FIG. 6 illustrates the 3D image Night Light Gun secondary LED's, 51 and 52 as activated in the all light calm mode of the Night Light. As shown, the light can shine as four light beams in the stand alone position. The 3D Image Night Light Gun also has a button 50 to activate secondary LED's.

Figure 7:
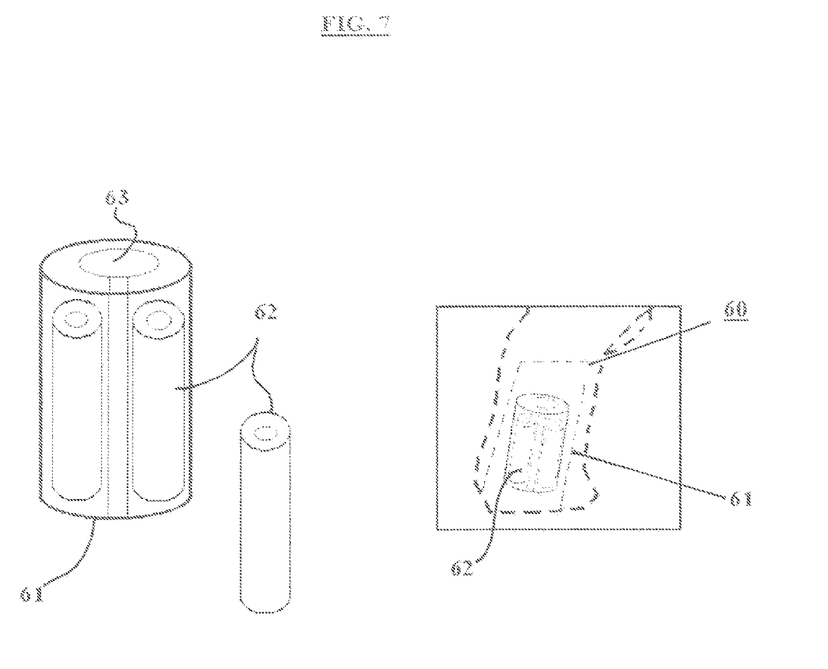
FIG. 7 is a perspective view illustrating the power source and battery compartment of the Night Light.

FIG. 7 illustrates the 3D Image Night Light Gun power source unit 60. The power package 61 is used to provide electrical power and can be provided from any commercially available selection of dry cell batteries such as AAA batteries 62, positioned to contact conventional conducting plate 63.

Figure 8:
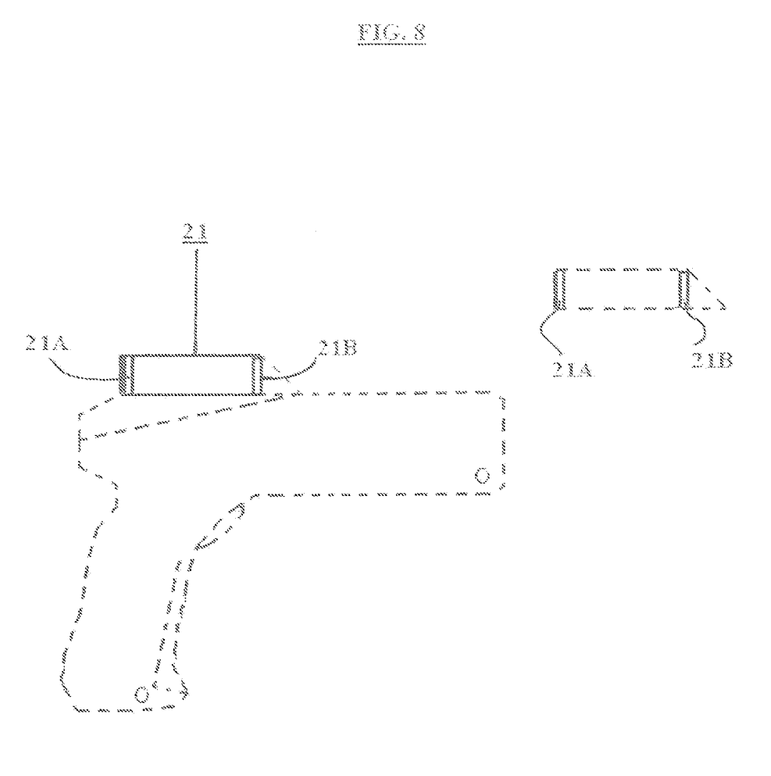
FIG. 8 is a side perspective view illustrating the 3D prism lens attachment of the Night Light.

FIG. 8 illustrates the 3D prism lens attachment 21 that serves to view the projected images with the added prism lens effect. The prism style lens 21A and magnifying lens 21B add to the 3D experience.

Figure 9:
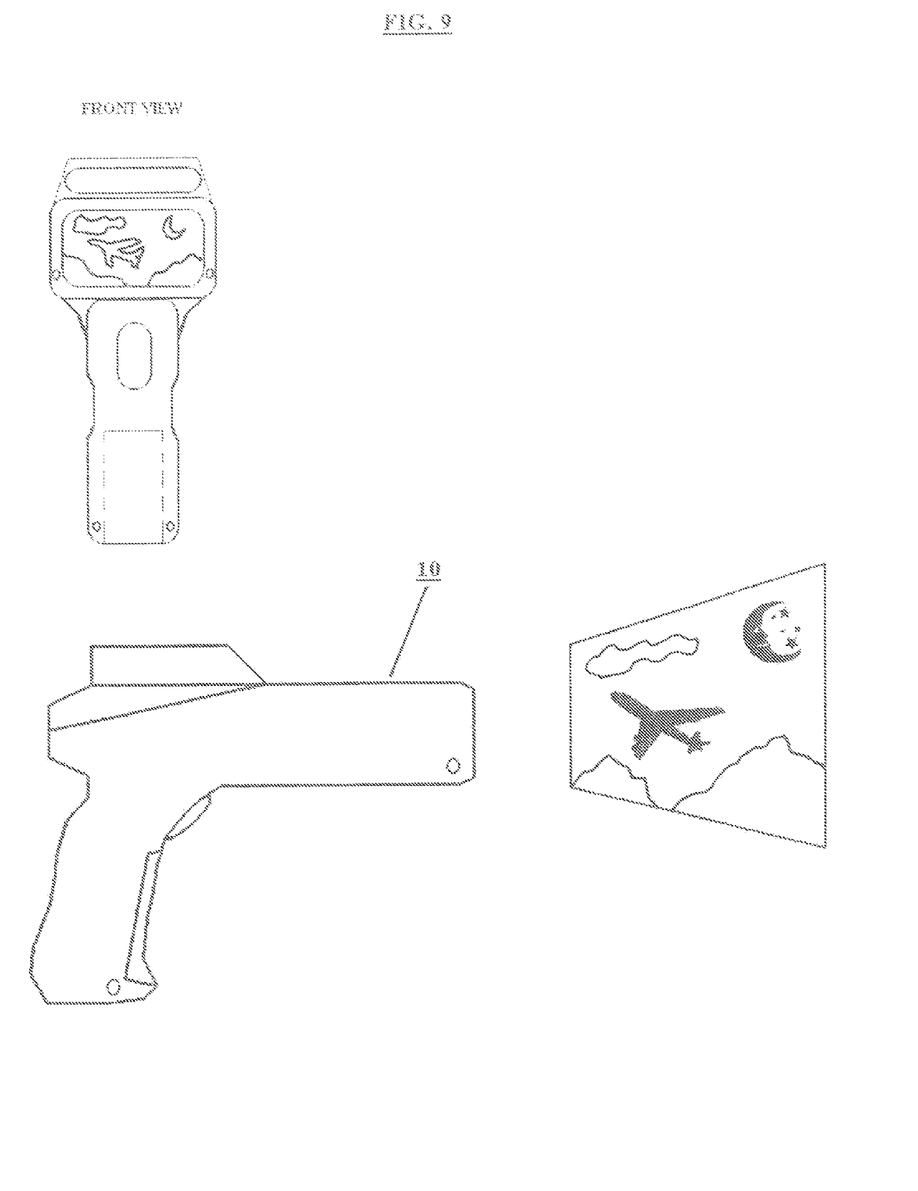
FIG. 9 is a side perspective view illustrating the activated 3D image projection of the Night Light.

FIG. 9 illustrates the 3D Image Night Light Gun 10 activated illustrating the 3D effect.

Except for the conducting metals, the micro motor and the power source, the materials used to fabricate the 3D Image Night Light Gun can be provided from any suitable source such as metal, wood, plastics, as well as combinations thereof. Preferably, durable and lightweight plastic materials are preferred such as high density polyethylene, polypropylene, polysulfones, polystyrene and the like.

Although the 3D Image Night Light Gun has been described in some detail and with particularity, it will be appreciated by those skilled in the art that various changes and modifications can be made therein without departing from the scope and spirit of the invention.

The invention claimed is:

1. A 3D image night light gun wherein the cyclical image array comprises two image assemblages, the background image assemblage and the 3D foreground image assemblage, and a LED light nested within the image array, secondary LED's produce the all light calm activated mode; including a micro motor and a sprocket to cycle cyclical image assemblage causing both the background still image and foreground 3D image to illuminate through the image projection tunnel lens giving the illusory effect of two viewing planes, adding to the 3D viewing effect.

2. The Night Light of claim 1 wherein said cyclical image array has a plurality of randomly spaced decal removable images on cyclical image array, said decal images being selected from the group consisting of robots, jets, heavenly bodies, geometric shapes and mixtures and combination thereof.

3. The Night Light of claim 1 wherein said primary LED light is nested within the cyclical image array to illuminate both the background and 3D foreground image assemblages and finally through the focus magnifying lens within the image projection tunnel; including secondary LED's positioned for the all light calm activated mode nested on the hollow front end and the bottom handle.

4. The Night Light of claim 1 wherein the image projection tunnel utilizes the two magnification lens and one focus magnifying lens to project the background and 3D images and onto a wall, the center focus magnifying lens serves to adjust image and is attached to a spring button mechanism.

5. The Night Light of claim 1 that includes a 3D spectrum lens and a magnifying lens attachment, 3D spectrum lens produces illusory effect and the magnifying lens exaggerates the produced image, both adding another viewing mode.

* * * * *